(12) United States Patent
Taine et al.

(10) Patent No.: US 11,081,142 B2
(45) Date of Patent: Aug. 3, 2021

(54) MESSENGER MSQRD—MASK INDEXING

(71) Applicant: Facebook, Inc., Menlo Park, CA (US)

(72) Inventors: Stephane Taine, Issaquah, WA (US);
Brendan Benjamin Aronoff, San Francisco, CA (US); Jason Duane Clark, Woodinville, WA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/829,264

(22) Filed: Mar. 25, 2020

(65) Prior Publication Data
US 2020/0227090 A1 Jul. 16, 2020

Related U.S. Application Data

(63) Continuation of application No. 16/521,832, filed on Jul. 25, 2019, now Pat. No. 10,643,664, which is a continuation of application No. 15/356,017, filed on Nov. 18, 2016, now Pat. No. 10,950,275.

(51) Int. Cl.
*G11B 27/22* (2006.01)
*G11B 27/10* (2006.01)
*G11B 27/036* (2006.01)
*G11B 27/34* (2006.01)
*H04N 7/15* (2006.01)

(52) U.S. Cl.
CPC ............ *G11B 27/22* (2013.01); *G11B 27/036* (2013.01); *G11B 27/102* (2013.01); *G11B 27/34* (2013.01); *H04N 7/152* (2013.01); *H04N 7/155* (2013.01)

(58) Field of Classification Search
CPC ..... G11B 27/22; G11B 27/036; G11B 27/102; H04N 7/152; H04N 7/155
See application file for complete search history.

(56) References Cited

U.S. PATENT DOCUMENTS

| 2005/0063582 A1* | 3/2005 | Park | G06T 17/10 382/154 |
| 2013/0188840 A1* | 7/2013 | Ma | G06K 9/00261 382/107 |
| 2015/0245133 A1* | 8/2015 | Kim | H04R 3/005 381/92 |
| 2016/0300379 A1* | 10/2016 | Du | G06K 9/00248 |

* cited by examiner

*Primary Examiner* — Mishawn N. Hunter
(74) *Attorney, Agent, or Firm* — Kacvinsky Daisak Bluni PLLC

(57) ABSTRACT

Exemplary embodiments relate to the creation of a media effect index for group video conversations. Media effect application (e.g., in the form of graphical overlays, filters, sounds, etc.) may be tracked in a timeline during a chat session. The resulting index may be used to create a highlights reel, which may serve as an index into a live show or may be used to determine the best time to insert materials into a recording of the conversation. The index may be used to automatically detect events in the video feed, to allow viewers to skip ahead to exciting moments (e.g., represented by clusters of applications of particular types of media effects), to determine where each participant spoke in a discussion, or to provide a common "watch together" experience while multiple users watch a common video. An analysis of the index may be used for research or consumer testing.

20 Claims, 16 Drawing Sheets

Index Generation Logic 400

Centralized Communication System 500

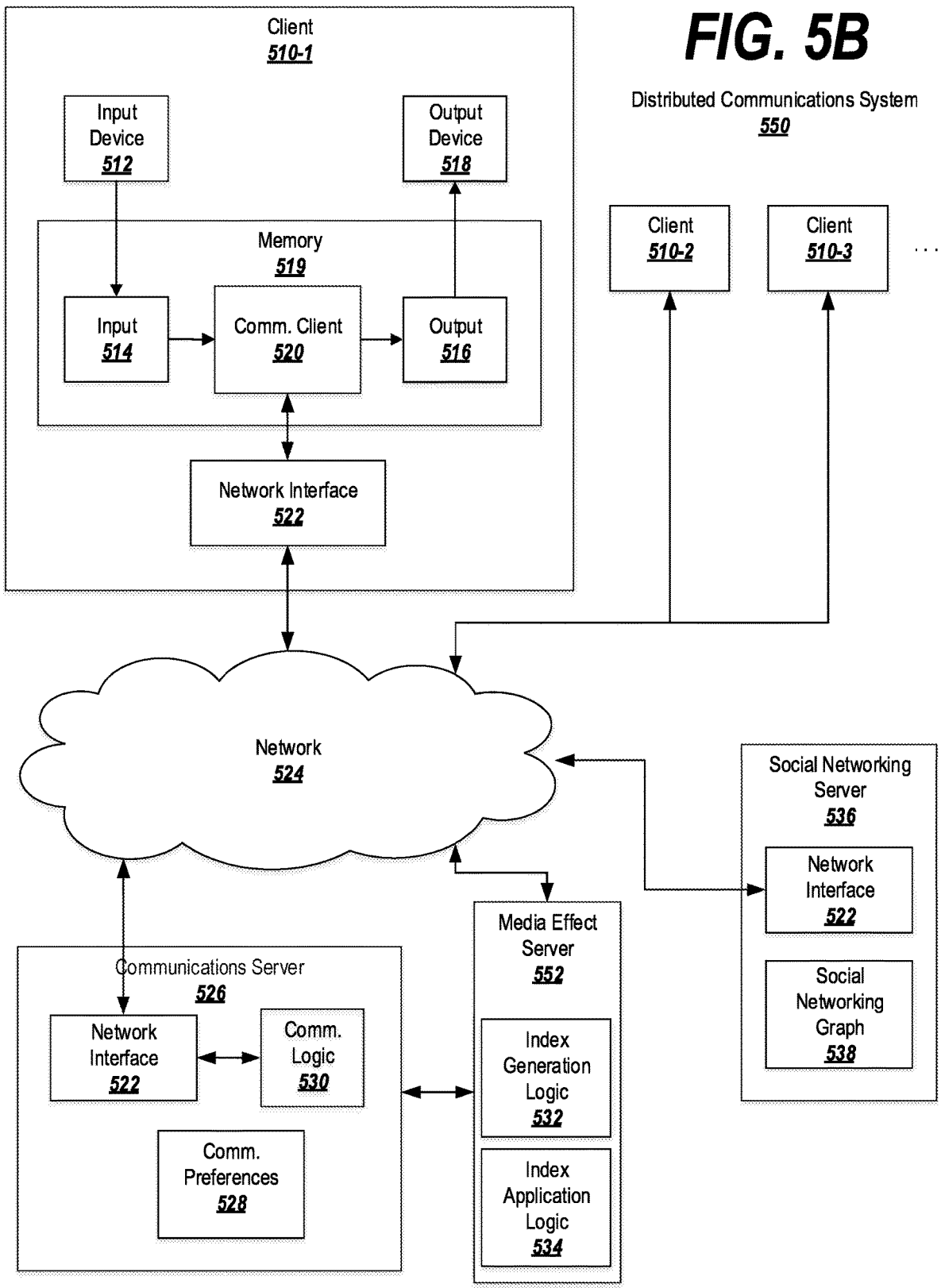

MESSENGER MSQRD—MASK INDEXING

CROSS-REFERENCE TO RELATED APPLICATIONS

This application is a continuation of, claims the benefit of and priority to previously filed U.S. patent application Ser. No. 16/521,832 filed Jul. 25, 2019, entitled "MESSENGER MSQRD—MASK INDEXING", which is a continuation of, claims the benefit of and priority to previously filed U.S. patent application Ser. No. 15/356,017 filed Nov. 18, 2016, entitled "Methods and Systems for Tracking Media Effects in a Media Effect Index", which are hereby incorporated by reference in their entireties.

BACKGROUND

Facial detection technology allows for the detection of a face in a photo or video, and in some cases allows for individuals to be identified based on their facial characteristics. Recently, facial detection techniques have been used to apply overlays on faces, such as by adding a graphical mask over a face in a video.

BRIEF DESCRIPTION OF THE DRAWINGS

FIG. 5B is a block diagram providing an overview of a system including an exemplary distributed communications service;

DETAILED DESCRIPTION

Figure 1A:
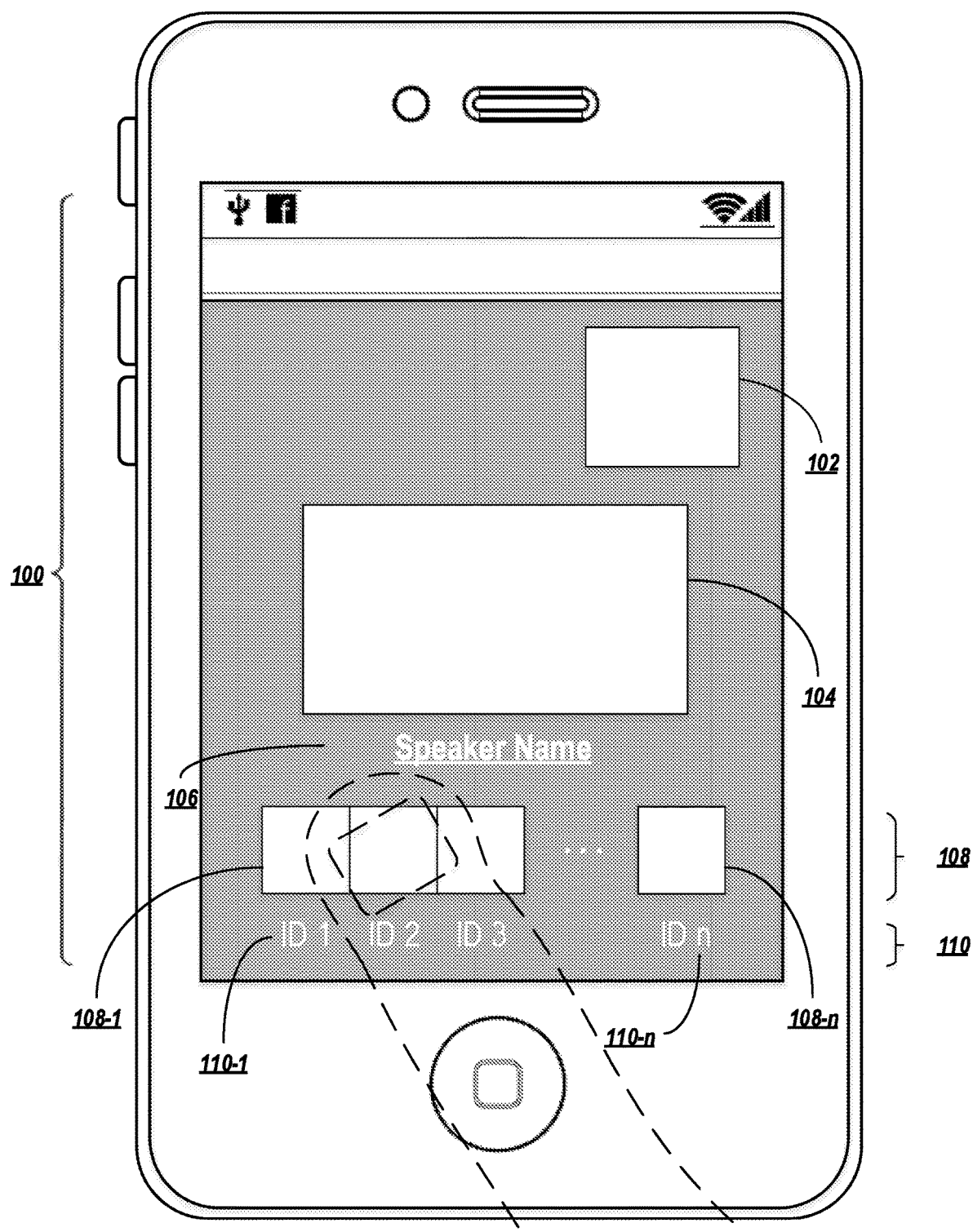
FIG. 1A depicts an exemplary interface for a video communication.

In addition to facial overlays, a number of media effects may be applied during a video conversation. For example, musical sound effects may be played, filters may be applied, other types of graphical modifications may be made, etc. These media effects may be applied manually by a user or may be applied automatically (e.g., based on a detected emotion). Because the media effects may be applied in order to emphasize an emotion or other characteristic of the user, the fact that the media effect was applied at a given time may provide contextual information about the video. Exemplary embodiments track the application of media effects in the video in order to extract and preserve such contextual information for a number of uses.

More specifically, exemplary embodiments relate to the creation of a media effect index for group video conversations. Media effect application may be tracked during a communication session and entries may be created in the index corresponding to the media effect application. Media effects may be stored with a variety of information, such as the time the media effect was applied, the user the media effect was applied to or by, an emotion associated with the media effect, an event associated with the media effect, etc. The media effect index may be created and maintained by a media effect server that applies the media effects.

The resulting index may be used for a wide variety of purposes. Examples include creating a highlights reel, determining the best time to insert media (such as promotional materials), automatically detecting events in the video feed (such as homeruns in a baseball broadcast), searching into a video feed for events or exhibited emotions, skipping ahead to exciting moments, determining where each participant (e.g., in a panel discussion) spoke, etc. The index may also be analyzed for a number of purposes, such as consumer testing.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1A depicts an interface 100 for a communications application adapted to show a group or one-to-one video call. The interface 100 may be displayed on the device of a first user. The interface 100 may include a preview window 102, in which the first user can see the video feed that they are currently sending to the rest of the participants.

The interface 100 may further include a main window 104 in which the speaker that has been currently selected as most-relevant is shown. The main window 104 may be the most prominent window in the interface 100, and may display a video feed that is larger in size and/or at a higher resolution than the video in the preview window 102 or other windows (such as the roster 108 described below).

Optionally, the participant displayed in the main window 104 may be identified on the interface 100 by an identifier 106. The identifier 106 may be, for example, the name or handle of the participant displayed in the main window 104.

A roster 108 of participants in the call may also be displayed. The roster 108 may include a window 108-i dedicated to each participant in the call, or may exclude the currently-relevant speaker displayed in the main window 104. Each window 108-i may display a video feed of the associated participant (if such a feed is available). The roster 108 may be associated with some functionality. For example, selecting one of the windows 108-i (as shown in FIG. 1A) may lock the selected participant to the main window for a period of time (or until the locking is manually canceled, or until an event occurs, such as another video feed becoming most relevant). Alternatively or in addition, selecting a window 108-i may cause additional information about the associated participant to be displayed, among other possibilities. The windows 108-i of the roster 108 may each be associated with an identifier 110-i identifying the participant in the window 108-i. The identifier 110-i may be, for example, a name or handle of the participant. In some cases, the participant may be associated with a long identifier and a short identifier (e.g., a full name and a nickname, or a full name and a first name only). In some embodiments, the short identifier may be displayed as the identifier 110-i, while the longer identifier may be displayed as the identifier 106 for the main window 104.

Figure 1B:
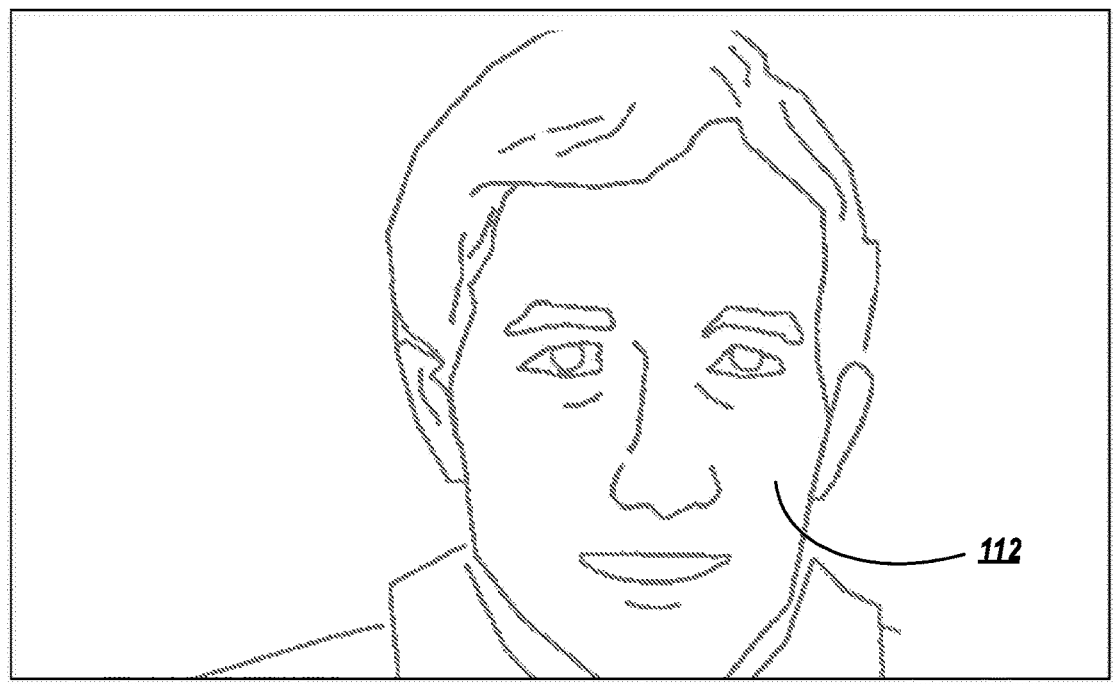
FIG. 1B depicts an exemplary frame from a video communication.
Figure 1C:
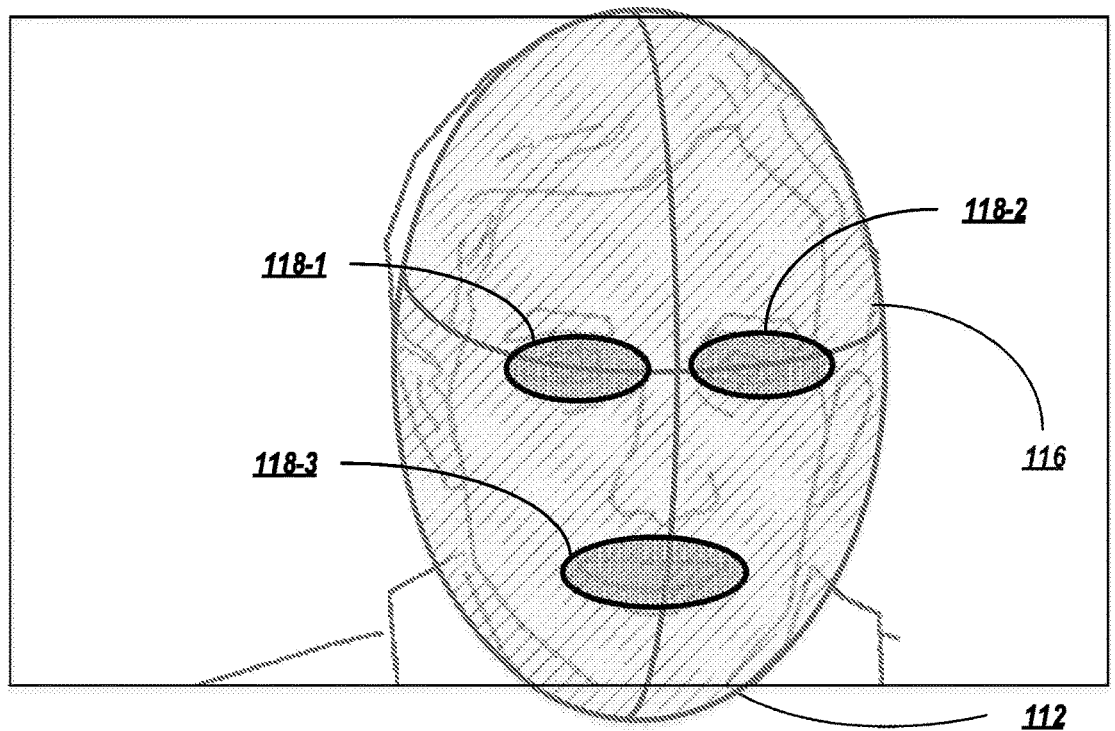
FIG. 1C depicts an exemplary technique for performing emotion detection.

FIG. 1B depicts an exemplary frame from a video communication. The frame may be, for example, an image from a video feed. The frame may include a participant's face 112. Analysis of the face 112 may be used to perform emotion detection, as shown in FIG. 1C.

Facial detection techniques may be applied to determine a bounding shape 116 that substantially contains the user's face 112. In some cases, it may be difficult to entirely encompass the user's face with a relatively simple bounding shape 116, and so some small portions of the face may extend beyond the boundaries of the bounding shape 116. Furthermore, because few people have perfectly square or oval faces, the bounding shape 116 may include some areas that do not contain the user's face. Preferably, the bounding shape 116 is sized and shaped so as to fit as much of the user's face in as possible, while avoiding encompassing areas that do not include the face. Further preferably, the bounding shape 116 is a relatively simple shape, such as a square or oval, rather than a relatively complex shape, such as a trapezoid or freeform curve.

Optionally, one or more axes of the bounding shape 116 may be defined. In the depicted example, the facial detection technique involves identifying features of the face, such as the ears, eyes, nose, and mouth. A vertical axis extends vertically through the approximate center of the face, splitting the eyes, nose, and mouth in half. A horizontal axis extends horizontally through the approximate center of the face, approximately through the ears and eyes.

The face may also be analyzed to identify especially expressive features, which may be particularly relevant to emotion detection. For example, the region corresponding to the eyes and mouth may be considered to be more expressive than (e.g.) the ears or hair. Accordingly, one or more expressive regions 118-1, 118-2, 118-3 may be drawn around the expressive features and analyzed for indications of emotion type (e.g., upturned or downturned mouth, raised or lowered eyebrows, furrowed brow, etc.).

As an alternative or in addition to the techniques above, other inputs may be used to perform emotion detection. For example, an audio feed may be analyzed to detect changes in a user's voice. Other sensor data may be used to detect characteristics associated with emotional states, as well. For instance, a heart rate monitor may detect an increased or decreased pulse; a fingerprint sensor may measure skin conductivity; an accelerometer or orientation sensor may detect a user's hand stability as the user holds their mobile device, etc. These and other characteristics may be associated with certain emotional states.

Figure 1D:
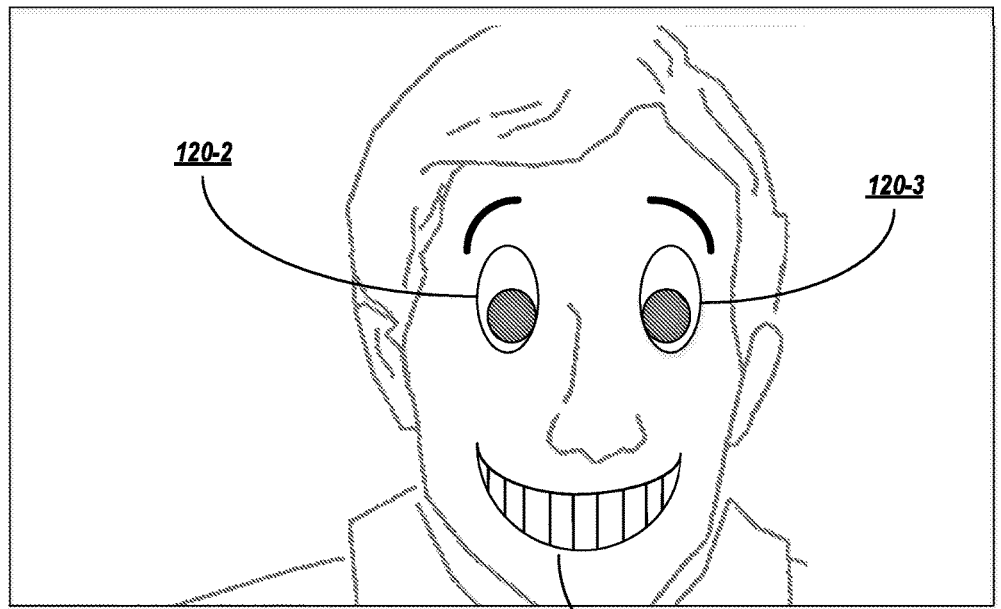
FIG. 1D depicts an exemplary interface in which a media effect is applied to a user based on a detected emotion.

After the user's emotional state is detected, the system may automatically apply a media effect associated with the detected emotional state. FIG. 1D depicts an exemplary interface in which media effects 120-1, 120-2, 120-3 are applied to a user based on a detected emotion. In this case, the system has detected a "happy" emotional state and applied a "happy" media effect (a graphical overlay with an exaggerated animation showing a smile and happy eyes).

The system may select and automatically apply a default media effect associated with the emotional state. Alternatively, the system may select and apply a media effect based on user preferences (e.g., a predetermined media effect selected by the user in advance), and/or based on previous user-applied media effects (e.g., media effects that the user has previously selected for application, particularly when applied during or close in time to the occurrence of the same or a similar emotional state as the detected emotional state).

Multiple different media effects may be associated with an emotional state. In some embodiments, upon detecting an emotional state, the system may display an indication of the emotional state (e.g., an icon associated with the emotional state, or text identifying the emotional state). A user may select one of the multiple media effects associated with the emotional state through different inputs. For example, on a touch display, a user may swipe left to apply a first media effect, swipe up to apply a second media effect, etc. In another example, a user may move the camera left, right, up, down, etc. to apply different media effects. Other techniques for selecting among predetermined or preselected media effects may also be used.

Figure 1E:
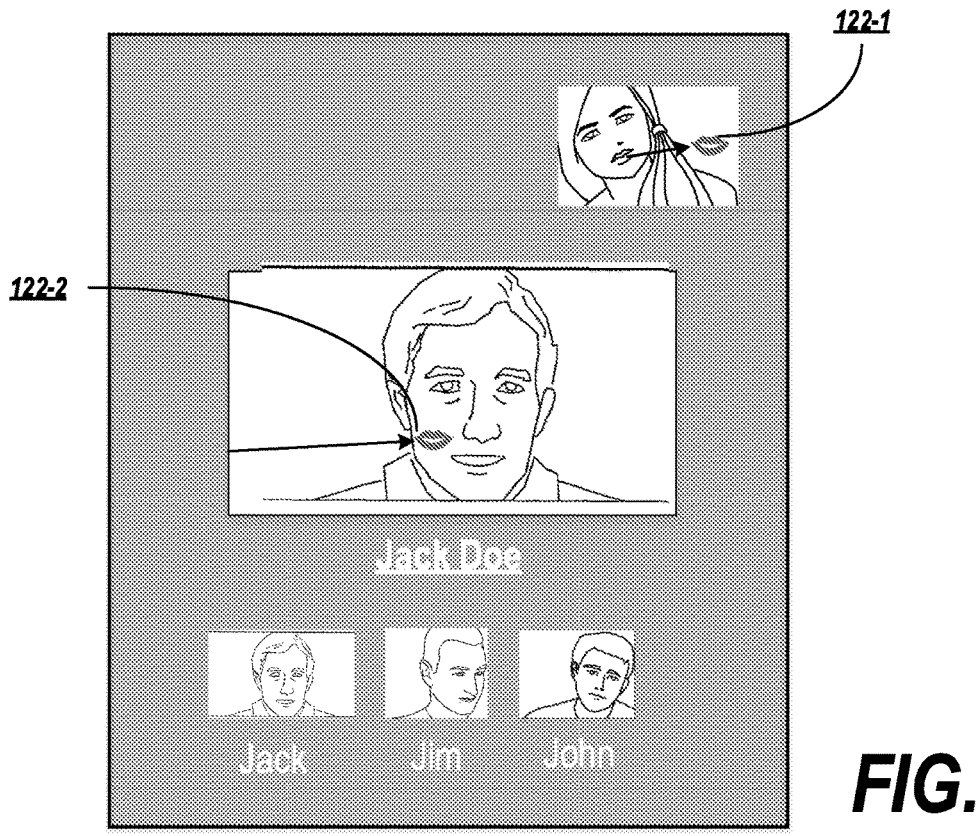
FIG. 1E depicts an exemplary interface in which a media effect is applied to multiple users based on a detected emotion.

The media effect may be added to the user's video stream and broadcast to other users, so that other participants in the conversation may experience the media effect. In some embodiments, a media effect may apply to a different participant than the participant who applied the media effect, or may apply to multiple users in a coordinated manner. For example, FIG. 1E depicts an interface in which a media effect is applied to multiple users based on a detected emotion.

In this case, the system detected an emotional state (e.g., a romantic emotional state) associated with a first participant (Jill) directed to a second participant (Jack). The system therefore applies a romantic media effect to both Jill's and Jack's video feeds. In this case, an animated kissing media effect 122-1 appears in Jill's display, initially centered on Jill's mouth. The effect 122-1 appears to fly to the edge of Jill's screen and disappears. It reappears as a media effect 122-2 on Jack's display and flies to Jack's cheek. Each participant in the conversation is able to see this coordinated media effect. Other examples may include animating an angry user's face as a dragon and showing the user breathing fire on another user, throwing snowballs, etc.

The multi-user media effect may be applied to the original (selecting) user for whom the emotional state was detected and at least one other user. The other user may be, for example, the currently-active user (e.g., the user that is currently speaking or otherwise considered to be most relevant), another user having the same emotional state, a user associated with a portion of the display at which the original user is currently looking (e.g., if the user is staring at another user's video feed and feeling an emotion that triggers a multi-user media effect, the media effect may be targeted at the other user's video feed), or a selected other user.

In some embodiments, the media effects may be automatically applied directly. In other cases, multiple candidate media effects may be identified, and a set of recommended media effects may be automatically presented.

Figure 1F:
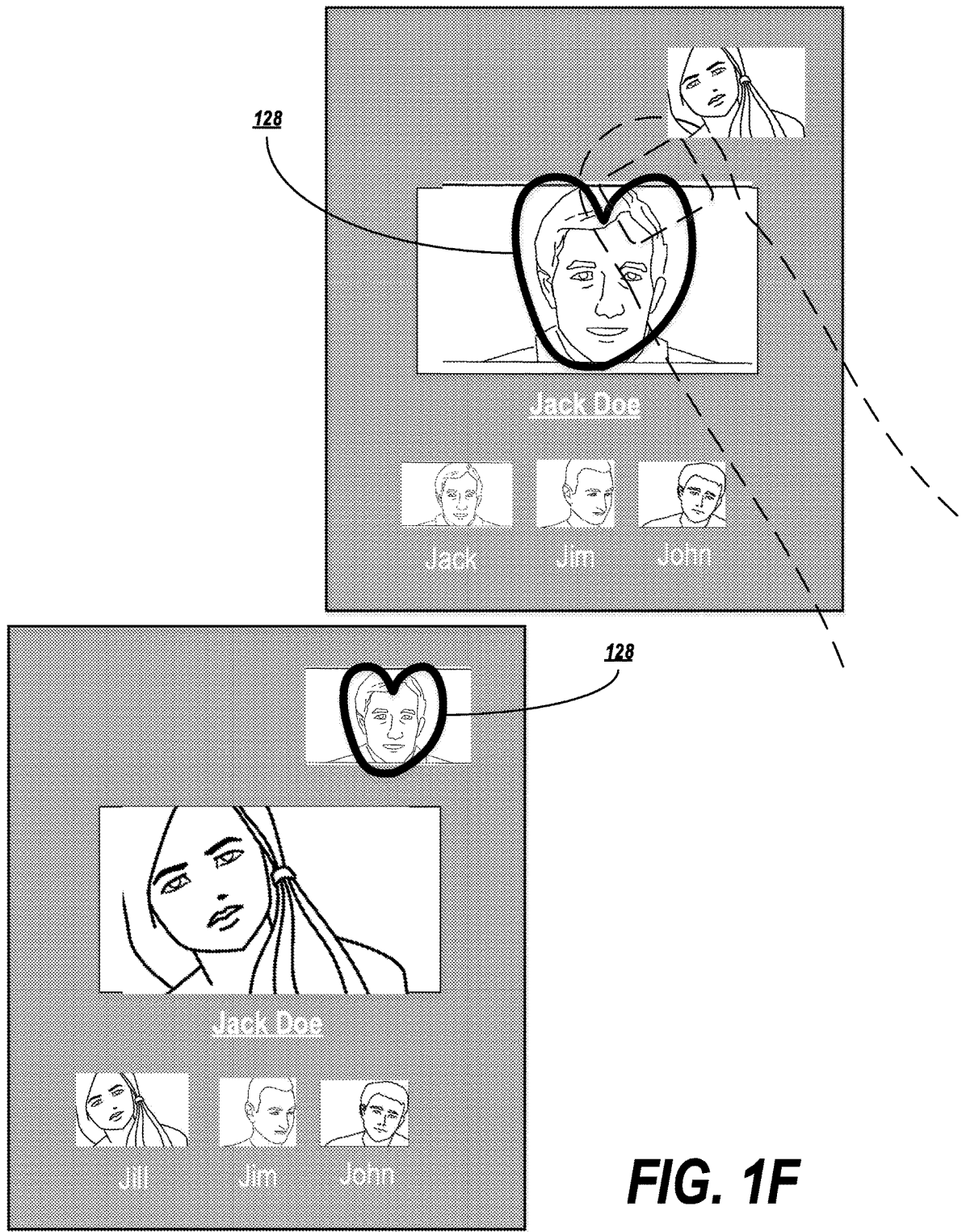
FIG. 1F depicts an example of a drawing applied over a communications interface.

Media effects are not limited to animations. For example, an icon for a third recommended media effect 126-3 allows the user to apply an audio effect to the video feed. Another type of media effect is a drawing or doodle applied over a display, as shown in FIG. 1F.

In this example, a first participant (Jill) interacts with a touch-screen display to draw one or more lines or shapes 128 on the communications interface (in this case, the main window displaying a second participant, Jack). An example of the first participant's display as the user draws the shape is shown in the upper half of FIG. 1F.

Graphics data may be transmitted as a media effect and applied to the displays of other users. The second participant's display is shown in the bottom half of FIG. 1F. In this example, Jack is displayed in the preview window, and the line/shape 128 is drawn in the appropriate location in the preview window.

Other participants would also see the graphic applied over the portion of the display corresponding to the second participant. In other embodiments, any drawn graphics or doodles may be displayed in the main window, regardless of the user currently displayed in the main window.

Figure 1G:
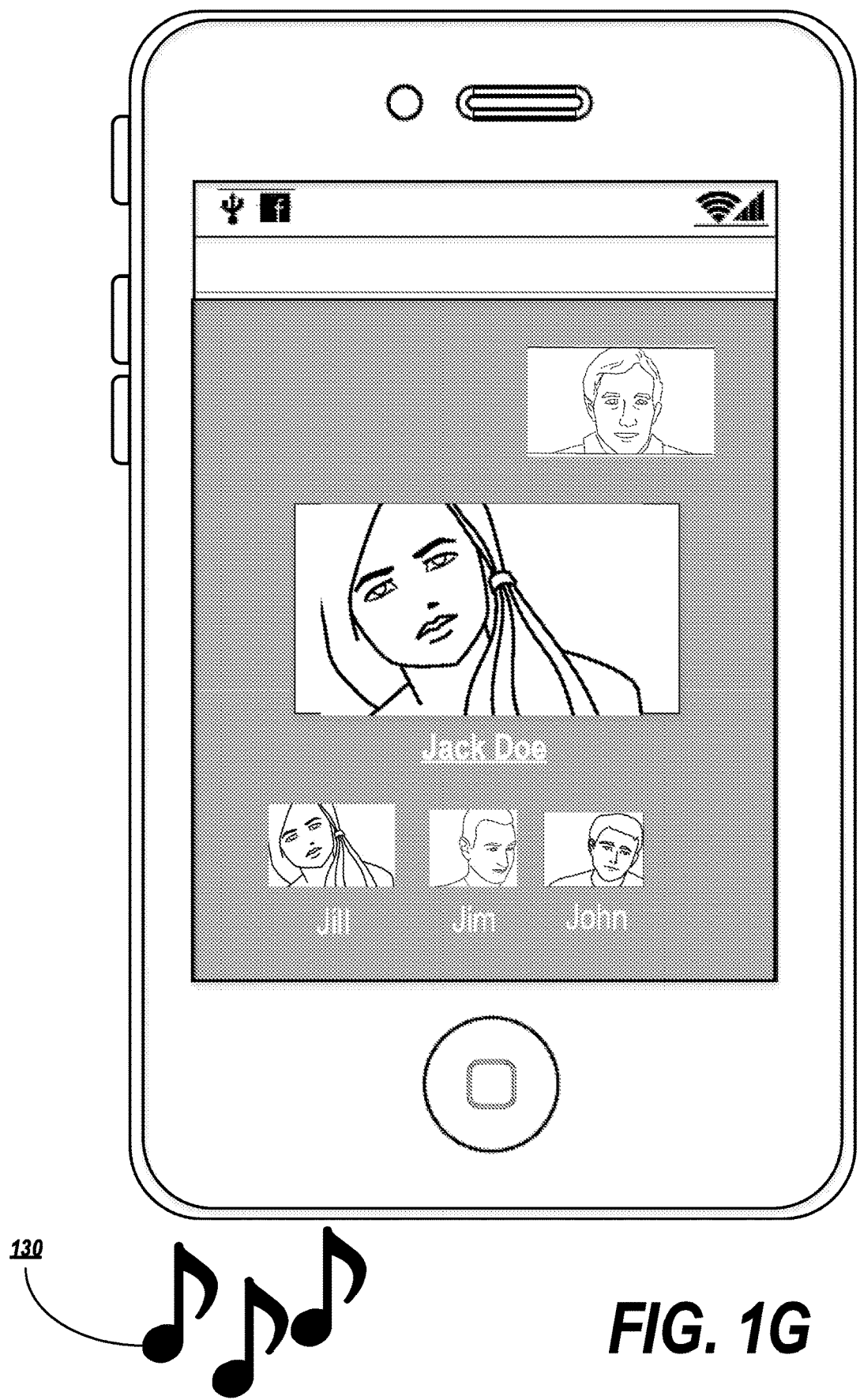
FIG. 1G depicts an example of an audible media effect.

Media effects need not necessarily be graphics. For example, FIG. 1G depicts an example of an audible media effect.130. In this case, triggering the media effect causes a song or recording to be played on participant's devices.

The above interfaces are intended to be non-limiting examples of applied media effects. Other types of media effects, such as modifying a background, applying a filter, etc. are also contemplated within the scope of the present application.

Next, an exemplary configuration for a system that applies media effects in a group conversation is described with reference to FIG. 2.

Exemplary System Configuration

Figure 2:
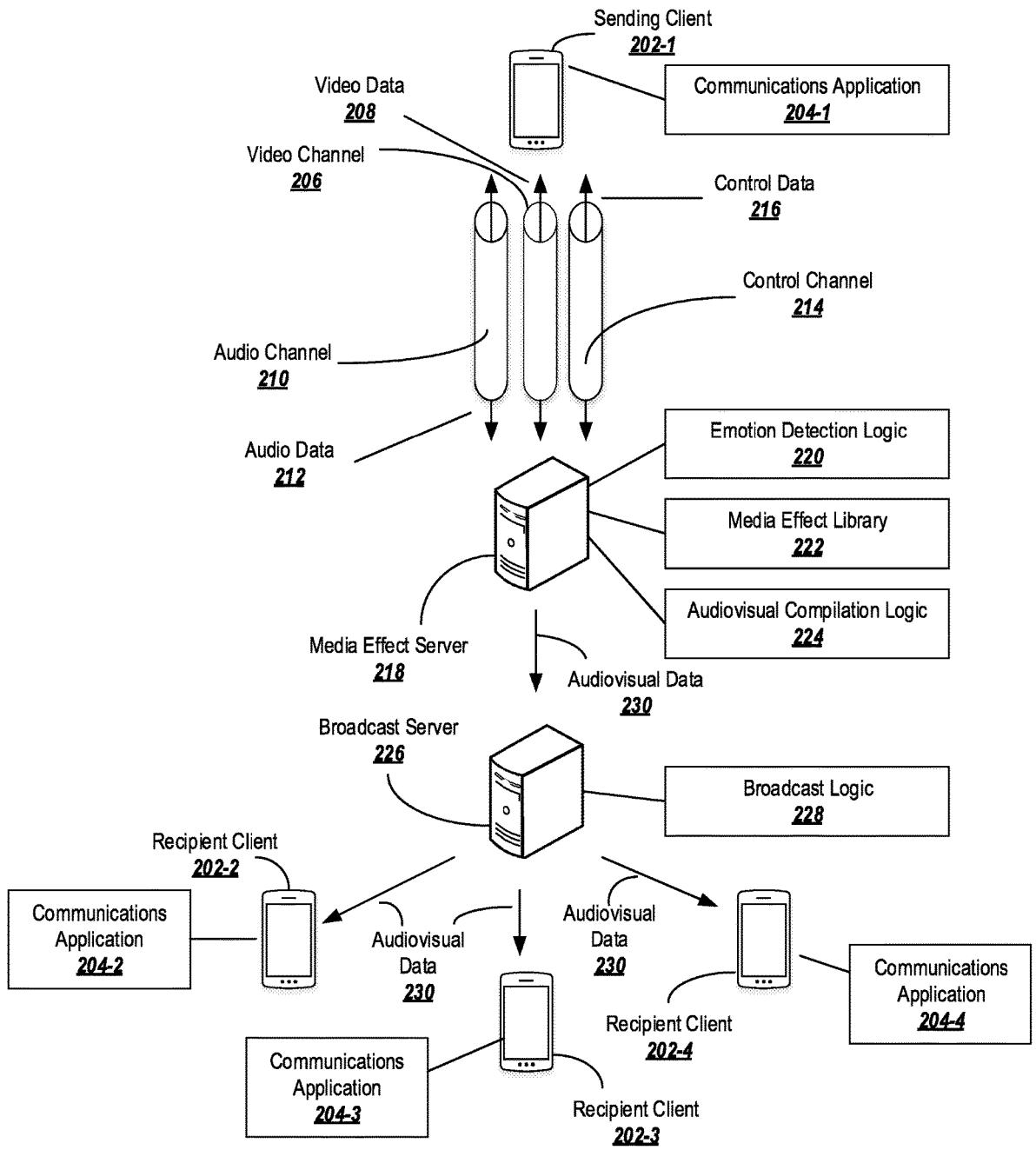
FIG. 2 depicts an exemplary system for recommending and/or applying media effects.

FIG. 2 depicts an exemplary system for recommending and/or applying media effects. Media effects may be applied automatically, manually, or a combination of both. A sending client 202-1 may be a device associated with a first participant in a video conversation. The sending client 202-1 may be, for example a mobile device (although the present invention is not limited to application by mobile devices) executing a communications application 204-1 for participating in a video communication with one or more other participants.

The communications application 204-1 may cause information associated with the video conversation to be transmitted to one or more servers that facilitate the conversation. For example, the information may include video data 208 containing graphical frames associated with the conversation, audio data 212 containing sound information to be synchronized with the graphical frames, and control data 216. The control data 216 may include various instructions, identifiers, etc. used to apply media effect that are synchronized to the video data 208 and the audio data 212.

Each type of data may be transmitted in an associated channel. For example, the communications application 204-1, or another component of the client 202-1, may open a video channel 206, an audio channel 210, and a control channel 214 with the media effect server 218. The video channel 206 may carry only video data 208 in a video format. Thus, the media effect server 218 may treat any data received on the video channel 206 as data in a video format and may process the data appropriately. Similarly, the audio channel 210 may carry only audio data 212 in an audio format.

The control channel 214 may transmit generic data that is not necessarily in a predetermined format, or may transmit control instructions in a specified control format. For example, the control channel 214 may carry an instruction to analyze the video data 208 and/or audio data 212 for emotional characteristics, or may carry an instruction to apply a media effect. The control channel 214 may be, for example, a Web Real Time Communications (WebRTC) channel.

The video channel 206, audio channel 210, and control channel may carry information in both directions. Thus, for example, the video channel 206 and audio channel 210 may carry data for display/playback on the sending client 202-1 (e.g., data relating to the video feeds of one or more recipient clients 202-2, 202-3, 202-4). The control channel 214 may carry recommendations from the media effect server 218, one or more identified emotional states, other instructions, etc.

The media effect server 218 may be configured to analyze the video data 208 and/or audio data 212 using emotion detection logic 220 for detecting an emotional state associated with the video data 208 and/or audio data 212. The media effect server 218 may also store a media effect library 222, which includes a number of available media effects and one or more associated emotional states that are paired with the media effects. The media effects may be identified by an identifier, and the media effect library 222 may optionally mirror a media effect library stored locally at the client devices 202.

The media effect server 218 may further include audiovisual compilation logic 224 for combining the video data 208, the audio data 212, and any applied media effects. The audiovisual compilation logic 224 may include logic for synchronizing the audio data 212 with the video data 208, and further for synchronizing the media effects with the combined audio/video data (or with the audio data 212 or video data 208 individually).

Once combined, the resultant audiovisual data 230 may be transmitted from the media effect server 218 to a broadcast server 226. The broadcast server 226 may include broadcast logic 228 that identifies one or more recipient clients 202-2, 202-3, 202-4 associated with the video communication. The broadcast server 226 may transmit the audiovisual data 230, which includes the audio data 212, the video data 208, and the applied media effects, to each of the recipient clients 202-2, 202-3, 202-4.

As media effects are received and applied by the media effect server 218, the media effect server 218 may create and maintain a media effect index. A description of an exemplary media effect index is next described with reference to FIGS. 3A and 3B.

Media Effect Index

Figure 3A:
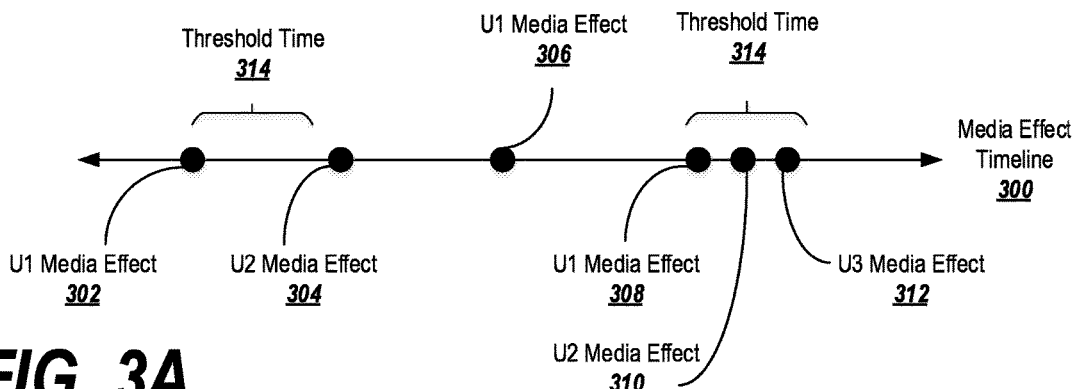
FIG. 3A is an exemplary timeline of media effect application.

A media effect index may store information regarding the context in which media effects are deployed. For example, FIG. 3A is an exemplary timeline 300 of media effect application in a video feed.

Initially, a media effect is applied to a first user as a first user media effect 302. For example, the media effect server may determine while the first user is speaking that the first user's video feed is associated with an emotional state, and the media effect server may automatically apply the first user media effect 302. Alternatively, the first user may manually apply the first user media effect 302, or another user may apply the first user media effect 302 to the first user.

Shortly thereafter, a second user begins to speak and another media effect is applied to a second user as a second user media effect 304. The first user then begins speaking again, and a third media effect is applied to the first user as a first user media effect 306.

As in the above example, media effects are often (though not always) applied to the currently active speaker. The active speaker is often, though not always, the participant that is shown in the main window of the video conversation. In some cases, a media effect may be applied to a non-active (or non-dominant) participant. This may cause the non-active participant to become the participant that is most relevant to the current conversation, and the non-active participant may be shown in the main window instead of the active or dominant speaker. Tracking media effect application may therefore provide information as to who is currently speaking and/or which participant is currently most relevant to the conversation.

Returning to the video call tracked in the timeline 300, at this point in the conversation some sort of event may occur. For example, the first user may say something funny, and the three participants may laugh. Alternatively, something exciting or shocking may occur, and the three users may undergo emotional reactions in quick succession. The media effect server may detect these emotional reactions and apply media effects to each of the users. Accordingly, the first three media effects are followed in a relatively short period of time by yet another media effect applied to the first user (First User Media Effect 308), another media effect applied to the second user (Second User Media Effect 310), and a media effect applied to the third user (Third User Media Effect 312).

The presence of events that trigger emotional responses may be detected by defining a threshold period of time 314 and determining whether a cluster (e.g., more than a predetermined number) of media effects are applied within the threshold period of time 314. For example, as shown in FIG. 3A, application of the first user media effect 302, the second user media effect 304, and the third user media effect 306 do not signify the occurrence of an event, because they are spaced apart by more than the threshold period of time 314. On the other hand, the first user media effect 308, the second user media effect 310, and the third user media effect 312 do signify the presence of an event, because they fall within the threshold period of time 314 with respect to each other. Thus, these latter media effects may be assigned to or associated with an event.

Figure 3B:
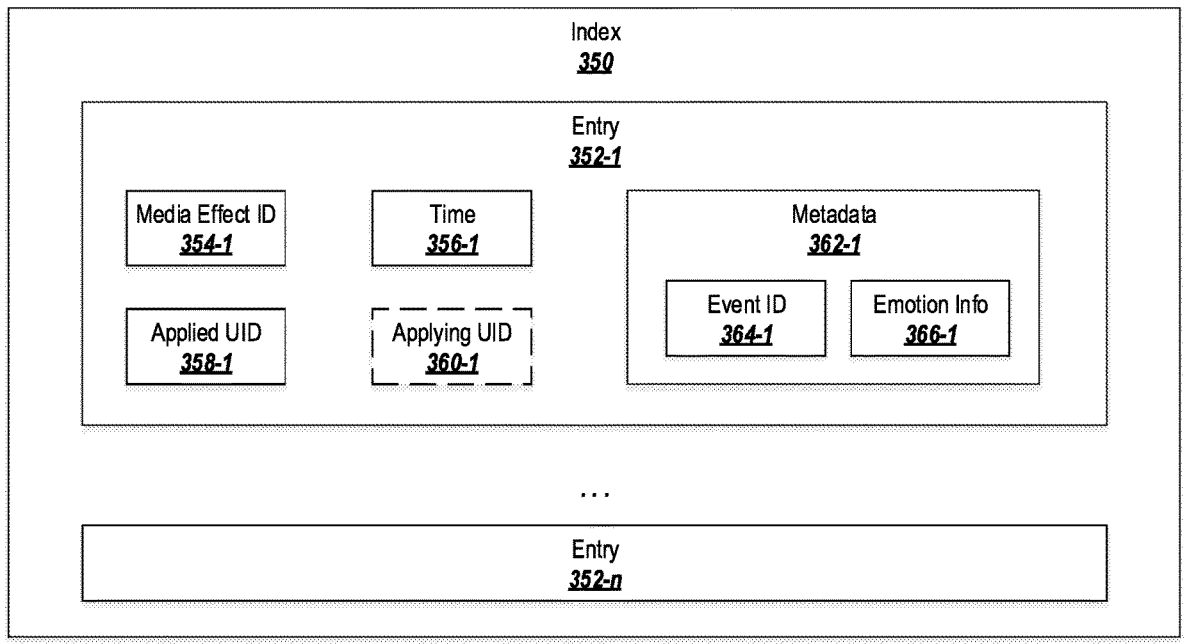
FIG. 3B is an exemplary data structure for holding a media effect index.

Information about the applied media effects, the emotional state associated with the media effects, and any events related to the media effects may be stored in a media effect index, such as the exemplary index 350 depicted in FIG. 3B.

The index 350 may include one or more entries 352. Each entry 352 may be made up of a number of fields for storing data values.

For example, a media effect ID field 354 may store an identifier associated with the applied media effect. The identifier may designate a type or name of the media effect applied (e.g., "happy face animation" or media effect number "123"). Alternatively or in addition, the media effect ID field 354 may store a unique designator for a particular media effect (e.g., the specific first user media effect 302).

A time 356 field may identify a time during the video conversation at which the media effect was applied. The time may be, for example, a timestamp indicating the time of day at which the effect was applied, a relative time from the beginning or end of the video conversation or a particular point in the video conversation (e.g., since a break in the video conversation), a time since the application of the previous media effect or since the occurrence of an event, etc.

The entry 352 may also include an applied user ID 358, indicating the conversation participant to which the media effect was applied, and optionally an applying user ID 360 indicating a user that applied the media effect to the applying user. The user IDs 358, 360 may identify the users by a designator such as a handle, an identification number, or any other suitable identifier.

The entry 352 may optionally include metadata 362 describing contextual information about the application of the media effect. Examples of metadata 362 include an event ID 364 identifying an event with which the media effect is associated, and emotion information 366 indicating a type of emotion whose detection led to the application of the media effect.

The index 350 may include more or fewer parameters than those depicted. For example, in some embodiments, the media effect index may also track the dominant or most-relevant participant in the conversation (e.g., the participant who is shown in the main window at any given time). The parameters may be applied in any suitable combination.

Next, exemplary methods for generating and using a media effect index are described in connection with FIGS. 4A-4B.

Exemplary Methods

Figure 4A:
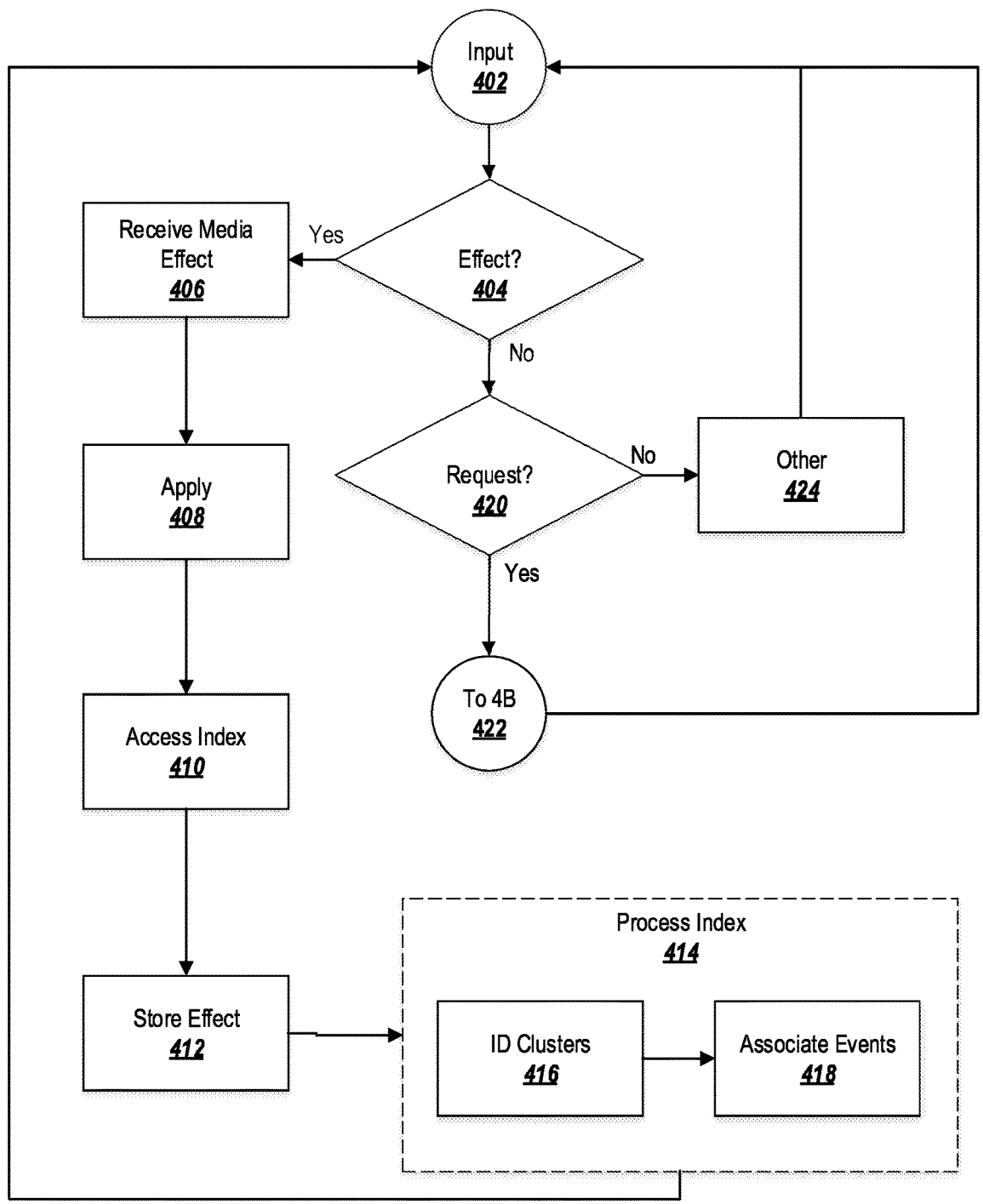
FIG. 4A is a flowchart depicting an exemplary procedure for generating an index of media effect application.

FIG. 4A is a flowchart depicting exemplary logic 400 for generating an index of media effect application.

At block 402, an input may be received at a system (such as the media effects server). The input may be a command, instruction, or other type of request. The input may be received on the above-described control channel. The input may be evaluated in order to determine a type of the input.

In some embodiments, the input may be an output of the media effect server, such as in the case where the media effect server analyzes video frame information from a video feed and automatically applies (or recommends application of) a media effect.

At block 404, it may be determined whether the input is an instruction to apply a media effect. If the decision at block 404 is "YES" (i.e., the input was a media effect application, then processing may proceed to block 406.

At block 406, the system may receive the media effect to be applied. If the media effect is stored locally in a media effect library, the media effect may be retrieved from the local storage. For example, the input may designate a media effect based on a media effect identifier, and the identifier may be used as an index to look up the appropriate media effect. If the media effect is stored remotely, the system may retrieve the media effect. Alternatively or in addition, a copy of the media effect may be supplied with the input received at block 402.

At block 408, the system may apply the media effect. For example, the system may access video data on the video channel and audio data on the audio channel, incorporate the media effect into the audio and/or video data, and synchronize the data for transmission to the broadcasting server.

In some embodiments, the media effect need not necessarily be applied in order to be recorded in the media effect index. For example, the system may detect an emotional state that would trigger a media effect, but the user may cancel application of the media effect (or user settings may preclude application of the media effect). In this case, information about the media effect may still be recorded in the media effect index, optionally along with a flag indicating that the media effect was not applied. This information may be useful in generating timelines and performing searches, as described below in connection with FIG. 4B.

At block 410, the system may access an index of media effect applications. The index may be stored locally, at the system, or remotely. The index may be distributed among several devices (e.g., each client may maintain its own index tracking application of its own media effects, or tracking application of all media effects). If the index does not yet exist locally (e.g., because the media effect applied in block 408 was the first media effect applied in a conversation and the index was not automatically generated when the conversation commenced), then at block 410 the index may be created.

At block 412, the system may record the application of the media effect in the index.

The system may identify the media effect applied based on an ID. The media effect ID may be, for example, specified in the input, may be received as part of the media effect. Alternatively or in addition, the media effect may be assigned a new descriptor that is maintained by the system. The media effect may be analyzed or processed in order to generate a unique ID (e.g., a hash of the audio or video data of the media effect may be used as an identifier of the media effect). The media effect ID may be an index into a media effect library.

The system may identify a time at which the media effect was applied. The time may be a relative time (e.g., relative to the start of the video conversation, an event or break in the video conversation, the last time at which a media effect was applied, etc.). The time may be non-relative (e.g., a local time as recorded by the system).

The system may identify the participant(s) that the media effect was applied to and/or by. If the media effect was associated with emotion data (e.g., the media effect was applied as a result of a detected emotion, or the media effect is otherwise associated with an emotion type), then the emotion data may also be identified.

Any or all of the above information may be stored in the media effect index at block 412. Additional characteristics may also be stored with the above-described information.

At block 414, the system may process information in the index to identify further characteristics of the data. For example, the system may, at block 416, identify one or more clusters of media effect applications based on the time values stored on different entries in the index. If more than a predetermined number (e.g., two or more, three or more, etc.) of media effects were applied within a predetermined period of time (e.g., one second, two seconds, five seconds, etc.), then the media effects may be associated with an event identifier at block 418. In some embodiments, only media effects having corresponding emotion types (e.g., shocked, happy, etc.) may be associated with the event identifier.

Processing may then return to block 402 and a new input may be processed.

Returning to block 404, if the decision at this block is "NO" (i.e., the input was not a media effect application), then processing may proceed to block 420 and it may be determined if the input was a request for information or action relating to the media effect index. If the decision at block 420 is "YES," then processing may proceed to block 422 and the logic 452 described in connection with FIG. 4B may be carried out. Processing may then return to block 402 and another input may be processed.

If the decision at block 420 is "NO" (i.e., the input was not a request), then processing may proceed to block 424 and the input may be processed according to other logic designated for the type of input provided. Processing may then return to block 402 and another input may be processed.

Figure 4B:
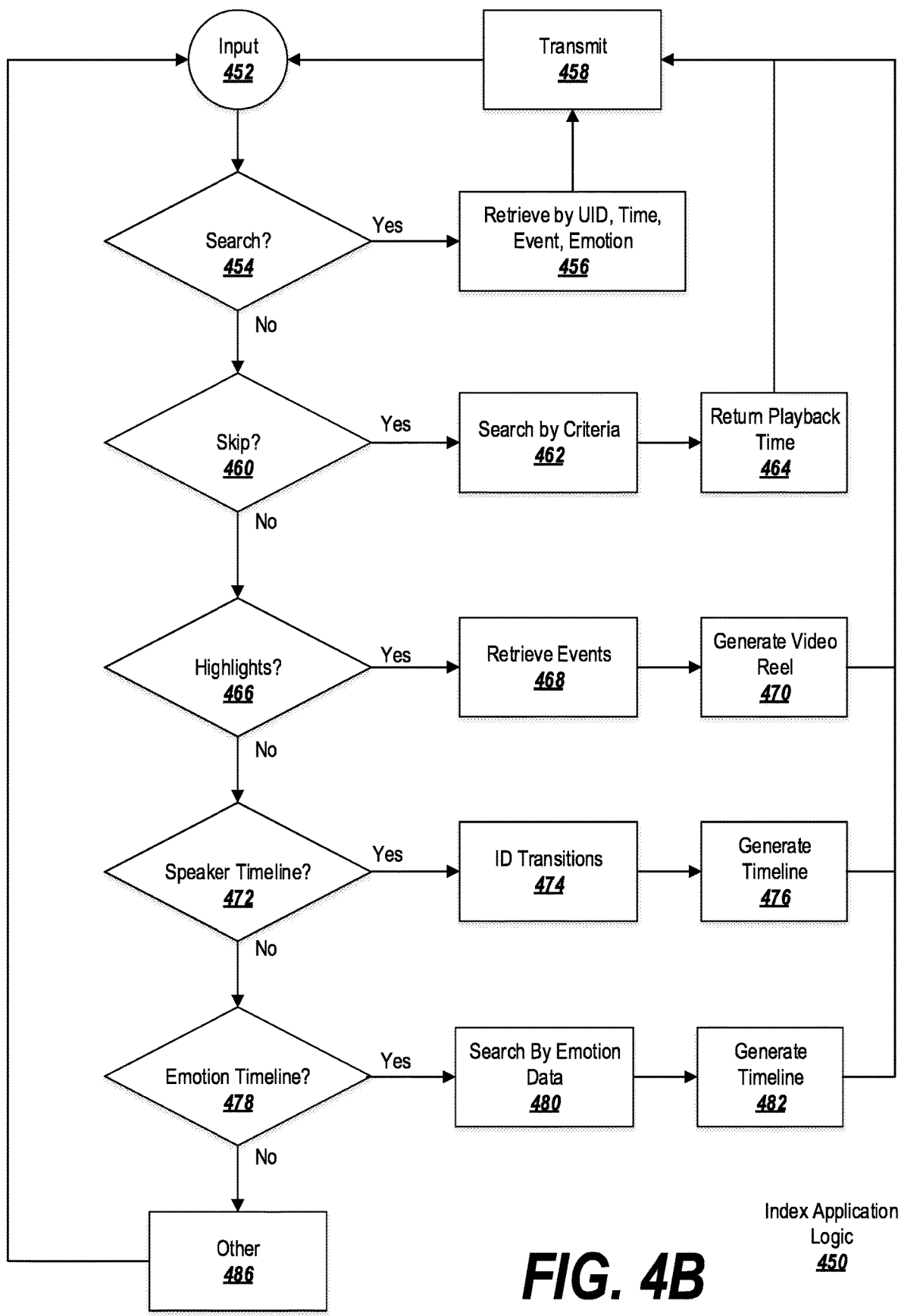
FIG. 4B is a flowchart depicting an exemplary procedure for applying a media effect timeline in various contexts.

Turning to FIG. 4B, exemplary logic 450 for applying a media effect timeline in various contexts is depicted.

At block 452, the system may receive an input. The input may be, for example, the type of input received at block 402 in FIG. 4A. The input may include a request to perform an action or generate an output, which may be identified (for example) by a request-ID or request type. Accordingly, the system may determine (e.g., based on the request-ID or request type) a type of request received.

At block 454, the system may determine if the input was a request to search the index based on provided criteria. If so, processing may proceed to block 456. At block 456, the system may search the media effect index based on one or more criteria provided in the input.

For example, the search request may include a request to identify any media effects applied to a particular user. The system may therefore search the media effect index based on the Applied UID 358 and return any results matching the search query. Similarly, the search request may include a request to identify media effects associated with a particular emotion type, a particular event ID, a particular applying user, or effects received at a certain time or in a certain time range. The search request may include conditions and may specify the conditions through the use of conjunctive or disjunctive operators (e.g., AND, OR, NOT, XOR), among other possibilities. Block 456 may return a set of media effect entries that match the search criteria.

At block 458, any returned results may be transmitted to the originator of the request. Processing may then return to block 452 and a new input may be processed.

At block 460, the system may determine whether the request was a request to skip to a location identified by a provided criteria. For example, a client device may be currently playing back a previously-recorded video conversation and may request to skip ahead to an event or media effect application. Alternatively or in addition, the client device may be engaged in an ongoing conversation, and the request may be a request to return to or replay a portion of the video conversation corresponding to the search criteria. If so, processing may proceed to block 462.

At block 462, the system may perform a search based on the criteria transmitted with the request. For example, if the request is simply a request to skip ahead to the next media effect application (or backwards to a previous media effect application), the request may identify the current playback time of the video conversation. The system may search forwards or backwards from the identified time in the media effect index, and may return the next/previous result.

The request might also be a request to skip to a particular point identified by the criteria. In this case, the criteria may be similar to those described in connection with the search functionality at blocks 454-456, and the system may perform a similar search to identify the media effects and/or times corresponding to the search criteria.

At block 464, the system may return a playback time at which the criteria are fulfilled. If more than one time meets the criteria, the system may return the next time at which the criteria are fulfilled. Processing may then proceed to block 458 and the identified playback time may be transmitted.

At block 466, the system may determine if the request was a request to generate a highlights reel. For example, a client device may transmit a request to identify highlights or key occurrences in a video including media effects, and to deliver a shortened video including only the highlights or key events. If so, processing may proceed to block 468.

At block 468, the system may search the media effect index for events (e.g., identified based on clusters of media effect applications, as described above), and may return a list of the events. The events may be designated so as to precede the application of the first media effect in reaction to the event, and to continue until after the final application of the last media effect in reaction to the event. Video, image, and/or audio processing may be performed around the clustered media effects in order to identify when the event starts and/or finishes. Alternatively or in addition, the event may be identified as occupying predetermined amounts of time before and/or after the cluster of media effects in response to the event.

At block 470, the system may generate a video reel that includes the events identified at block 468. Processing may then proceed to block 458 and the video reel may be transmitted.

At block 472, the system may determine if the request was a request to generate a timeline of speakers in the conversation. If so, processing may proceed to block 474.

At block 474, the system may search the media effect index for media effects that are consecutively applied to the same participant. In many cases, media effects are applied while the participant is speaking. In order to confirm that this is the case, the system may perform audio, video, and/or image processing to verify that the media effect is applied to a person who is speaking. Alternatively or in addition, confidence in whether a particular participant is speaking may be evaluated based on the number of media effects applied consecutively to the participant and/or the type of media effects applied by the participant and/or other participants. For example, a single media effect applied to a participant might indicate that the participant is reacting to something that someone else has said, whereas multiple media effects may indicate that the participant is the primary speaker in the conversation and is maintaining the interest of other users. Similarly, a "surprised" or "laughing" media effect may indicate that the participant is reacting to something that has occurred in the video feed (without the participant necessarily being the speaker), whereas an "incredulous," "consoling," or "encouraging" media effect type might indicate that the person is currently speaking.

If the media effect index stores entries relating to the dominant or most relevant participant, as in some embodiments, then this information may also be used to determine which participant is speaking at which time.

The media effects may be used to determine, for different times in the video, a confidence value as to which participant is currently speaking. Thus, a confidence gradient may be defined over the course of the video, with different participants identified as the more likely speaker at different times. As the confidence value for one participant decreases over time and another's increases, the system may identify likely transitions between speakers. The transitions may optionally be confirmed through audio, video, or image processing.

At block 476, the system may generate a timeline based on the transitions identified at block 474. The timeline may include times at which the speaking participant transitioned from one person to another. Processing may then proceed to block 458 and the generated timeline may be transmitted.

At block 478, the system may determine whether the request was a request to generate an emotion timeline. An emotion timeline may represent a timeline of when media effects representing different emotions are applied, which may be analyzed (e.g.) for market research, consumer testing, or other applications in which the reactions of a group of people are relevant.

If it is determined at block 478 that the request is a request for an emotion timeline, then at block 480, the system may search the media effect index for the same or similar groups of emotions. The search may be performed in a method similar to that described at block 456.

At block 482, the system may generate a timeline of emotions, in a similar manner to the timeline of speakers generated at block 476. For example, given the emotion type associated with different media effects applied over time, the system may identify a predominant type of associated emotion at different times over the course of the video. The system may generate a confidence score that may change over time in the video, and may identify transitions between different emotion types.

Alternatively or in addition, different emotion types may be present at the same time, and the system may maintain a tally of the different emotion types present in a given scene, and/or a ratio of different emotion types. For example, if the video is a focus group testing a product or idea, some participants may react positively while others may react negatively. The system may detect application of media effects based on these emotional states.

In some embodiments, the system may be configured to track emotional state and times at which media effects could be employed, without actually applying the media effects (e.g., when recording a focus group). This information may be relied upon in blocks 480 and 482.

The processing of the media effects may be supplemented by audio, video, or image processing to determine predominant emotion types.

Upon determining predominant emotions and/or numbers of different types of emotions experienced over time in the video, the system may format the resulting information into a timeline and transmit the emotion timeline at block 458.

If the input does not correspond to any of the above-identified options, then processing may proceed to block 486 and the input may be processed according to other logic suitable for the input provided. Processing may then return to block 452 and a new input may be processed.

Messaging System Overview

Figure 5A:
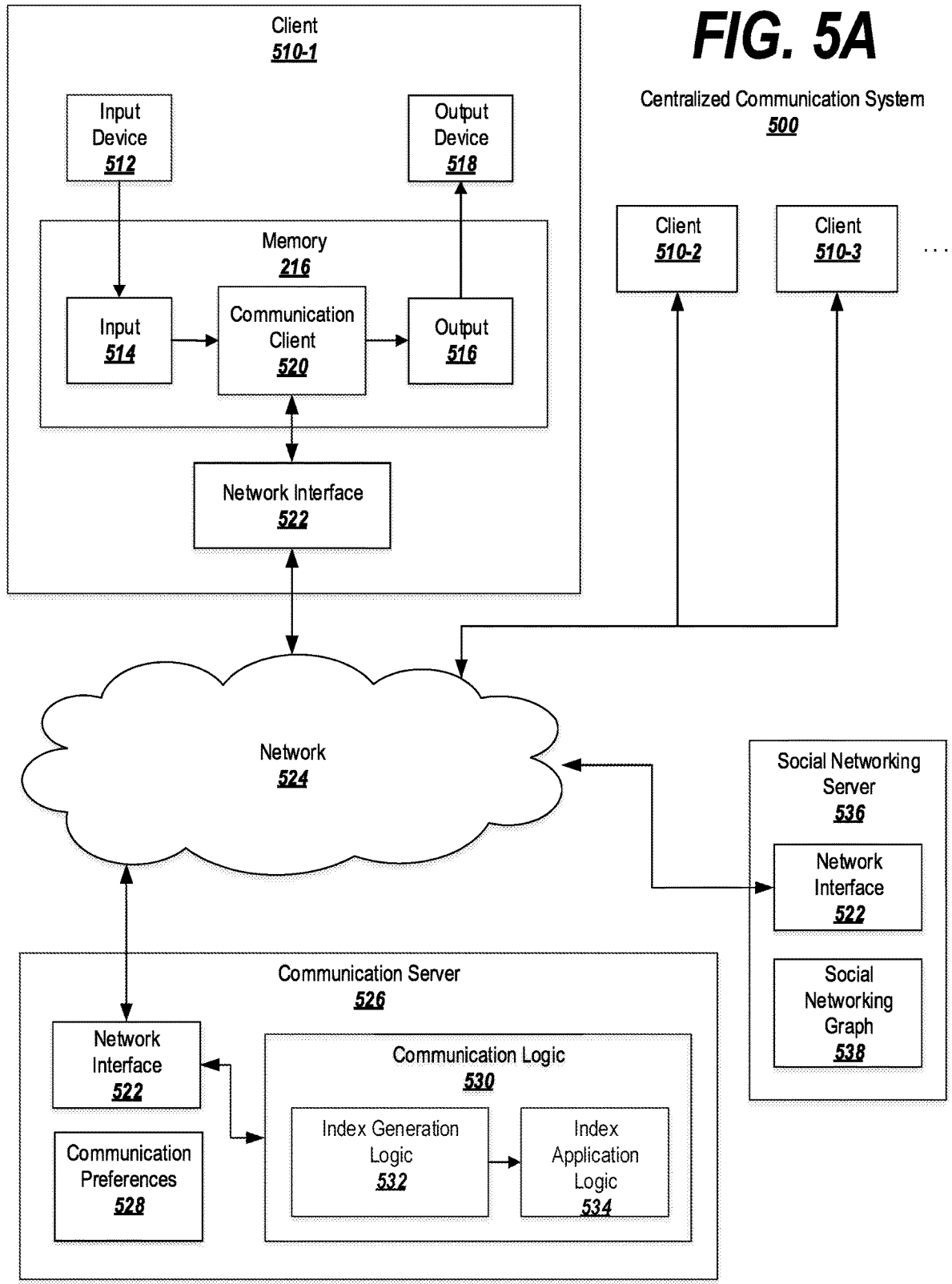
FIG. 5A is a block diagram providing an overview of a system including an exemplary centralized communications service.
Figure 5C:
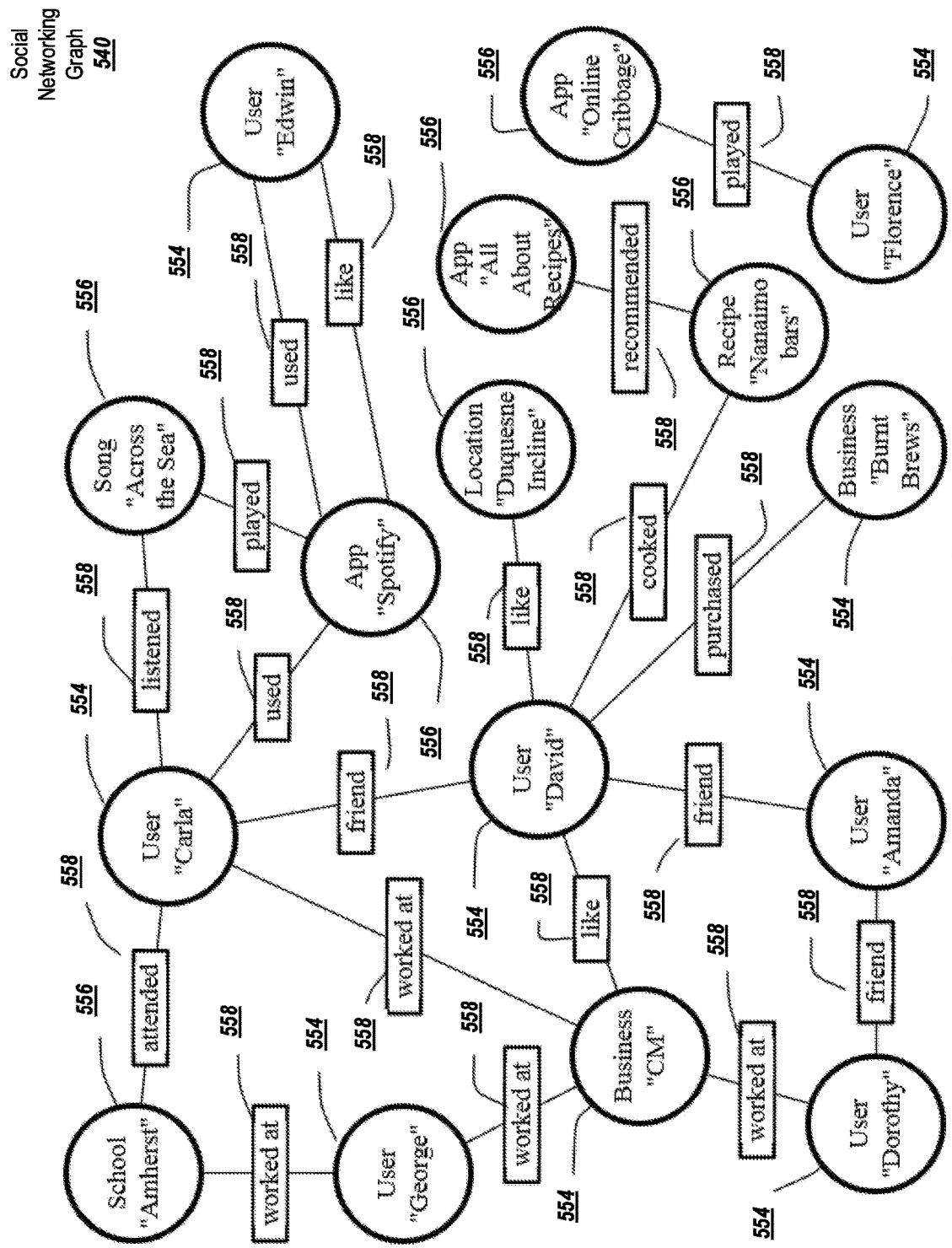
FIG. 5C depicts the social networking graph of FIGS. 8A-8B in more detail.

These examples may be implemented by a communications system that is provided either locally, at a client device, or remotely (e.g., at a remote server). FIGS. 5A-5C depict various examples of communications systems, and are discussed in more detail below.

FIG. 5A depicts an exemplary centralized communications system 500 generally arranged to receive, store, and deliver video communications. The centralized system 500 may implement some or all of the structure and/or operations of a communications service in a single computing entity, such as entirely within a single centralized server device 526.

The communications system 500 may include a computer-implemented system having software applications that include one or more components. Although the communications system 500 shown in FIG. 5A has a limited number of elements in a certain topology, the communications system 500 may include more or fewer elements in alternate topologies.

A client device 510 may transmit communications addressed to one or more recipient users, user accounts, or other identifiers resolving to one or more receiving client devices 510. In exemplary embodiments, each of the client devices 510 and their respective communications clients 520 are associated with a particular user or users of the communications service 500. In some embodiments, the client devices 510 may be cellular devices such as smartphones and may be identified to the communications service 500 based on a phone number associated with each of the client devices 510. In some embodiments, each communications client may be associated with a user account registered with the communications service 500. In general, each communications client may be addressed through various techniques for the reception of communications. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including communications data, requests, commands, user interface interactions, selections, and other types of input. The output devices 518 may include a speaker, a display device such as a monitor or touch screen, and other devices for presenting an interface to the communications system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a communications client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone and/or a video recording, such as in the case where the input device 512 is a camera. The input 514 may be subjected to automatic speech recognition (ASR) logic in order to transform an audio recording to text that is process sable by the communications system 500. The ASR logic may be located at the client device 510 (so that the audio recording is processed locally by the client 510 and corresponding text is transmitted to the messaging server 526), or may be located remotely at the messaging server 526 (in which case, the audio recording may be transmitted to the messaging server 526 and the messaging server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a communications server 526. The communications server 526 may be operative to receive, store, and forward communications between communications clients.

The communications server 526 may include a network interface 522, communications preferences 528, and communications logic 530. The communications preferences 528 may include one or more privacy settings for one or more users and/or communications. Furthermore, the communications preferences 528 may include one or more settings, including default settings, for the logic described herein.

The communications logic 530 may include index generation logic 532 that is operable to generate a media effect index. The communications logic 530 may further include index application logic 534 that is operable to process requests relating to the index and transmit the results of the requests to the client 510.

In some embodiments, communications may be sent peer-to-peer between users without the use of intervening server devices such as may implement the communications service 500. In these embodiments, the communications logic 530, including the index generation logic 532 and the index application logic 534, may reside on the client devices 510.

The network interface 522 of the client 510 and/or the communications server 526 may also be used to communicate through the network 524 with a social networking server 536. The social networking server 536 may include or may interact with a social networking graph 538 that defines connections in a social network. Furthermore, the communications server 526 may connect to the social networking server 536 for various purposes, such as retrieving connection information, messaging history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the messaging server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for applying media effects (e.g., the index generation logic 532 and/or the index application logic 534) are incorporated into the communications server 526. In contrast, FIG. 5B depicts an exemplary distributed communications system 550, in which functionality for recognizing productive intent and generating a list of suggested recipients is distributed and remotely accessible from the messaging server. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity. The primary difference between the centralized embodiment and the distributed embodiment is the addition of a separate media effect server 552, which hosts index generation logic 532 and the index application logic 534. The media effect server 552 may be distinct from the communications server 526 but may communicate with the communications server 526, either directly or through the network 524, to provide the functionality of the index generation logic 532 and the index application logic 534 to the communications server 526.

The embodiment depicted in FIG. 5B may be particularly well suited to allow exemplary embodiments to be deployed alongside existing communications systems, for example when it is difficult or undesirable to replace an existing communications server. Additionally, in some cases the communications server 526 may have limited resources (e.g. processing or memory resources) that limit or preclude the addition of the additional pivot functionality. In such situations, the capabilities described herein may still be provided through the separate media effect server 552.

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a specialpurpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
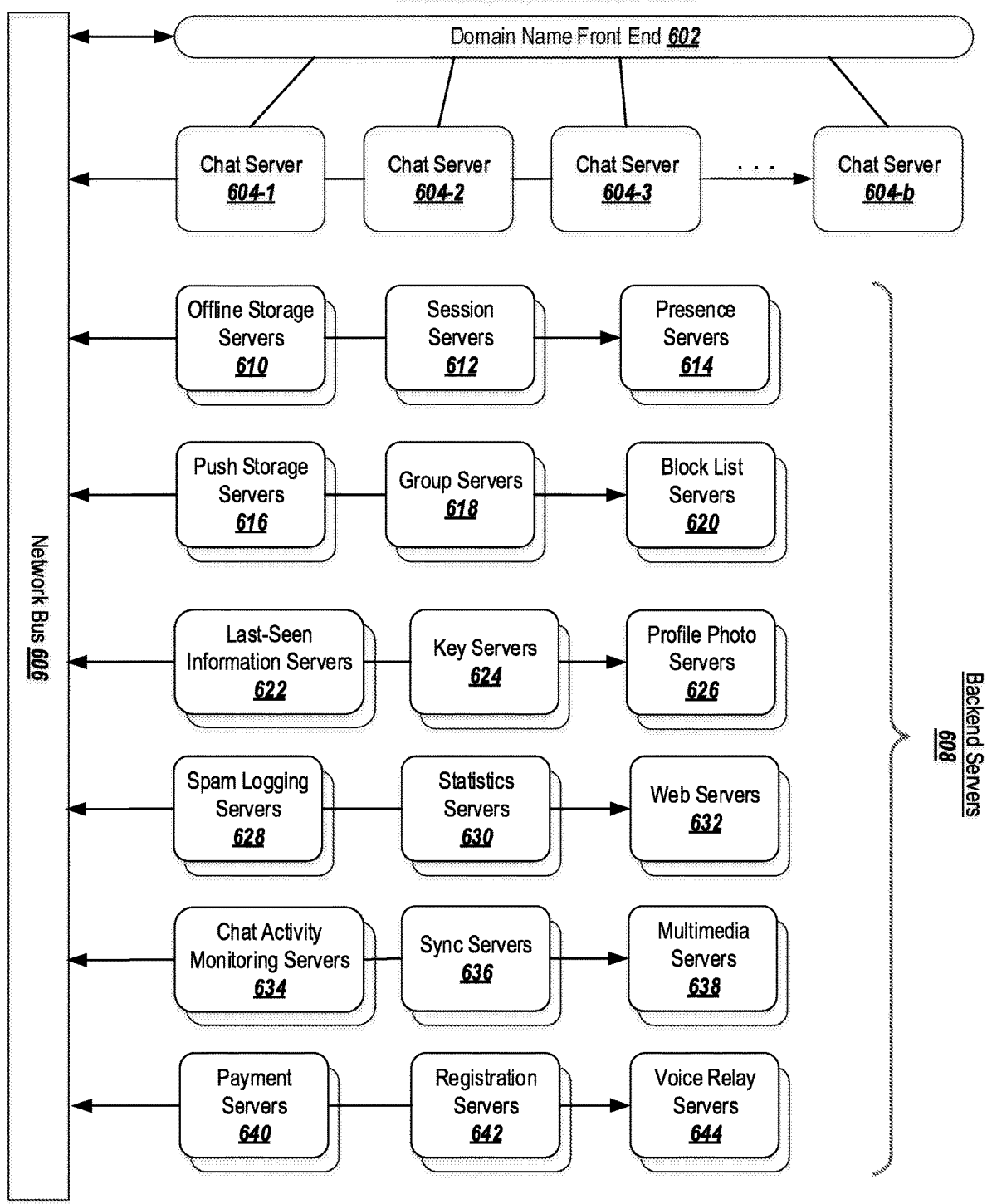
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the messaging system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-Internet-protocol (VoIP) voice communication between messaging clients for the performance of VoIP calls.

Figure 7:
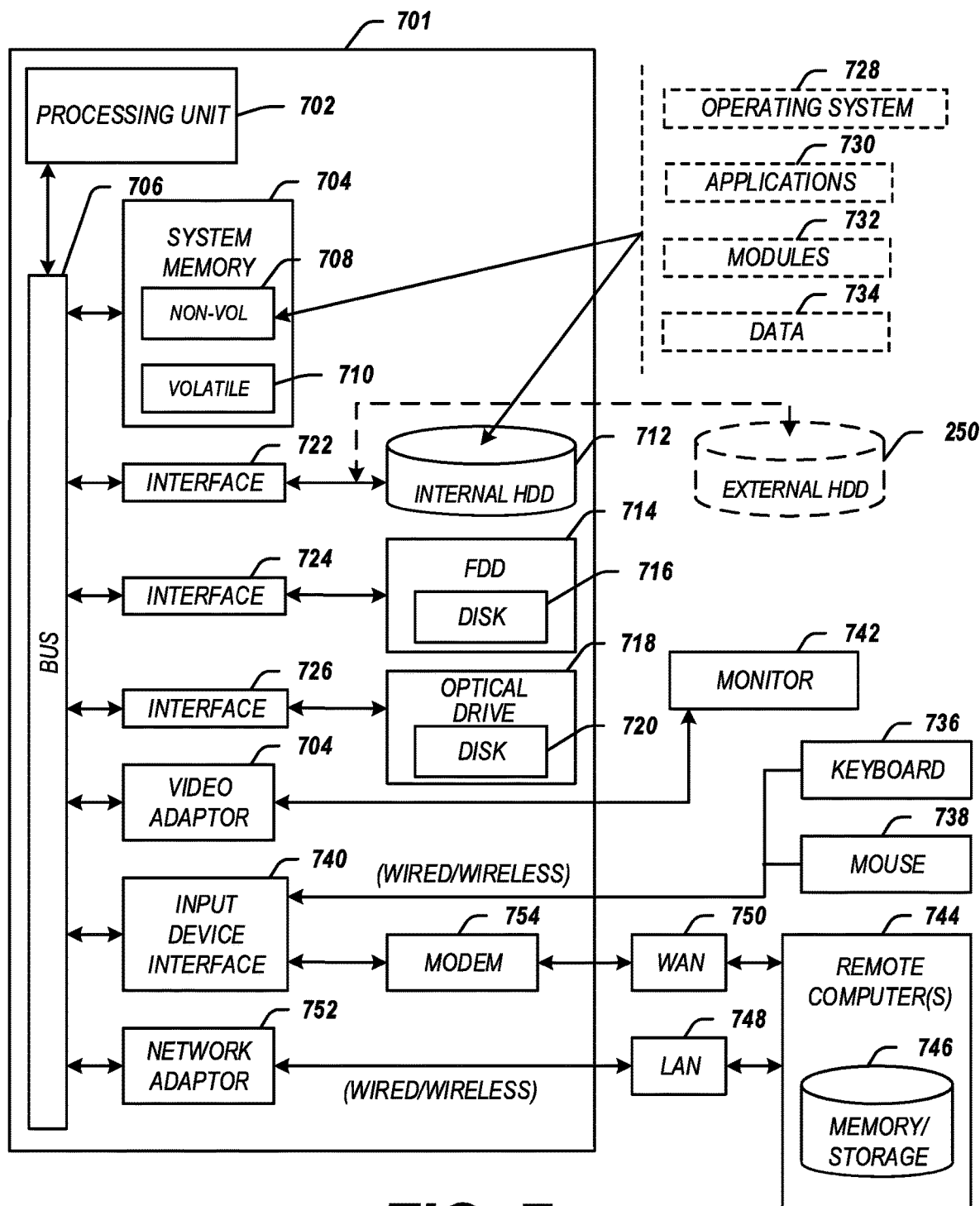
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface

740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
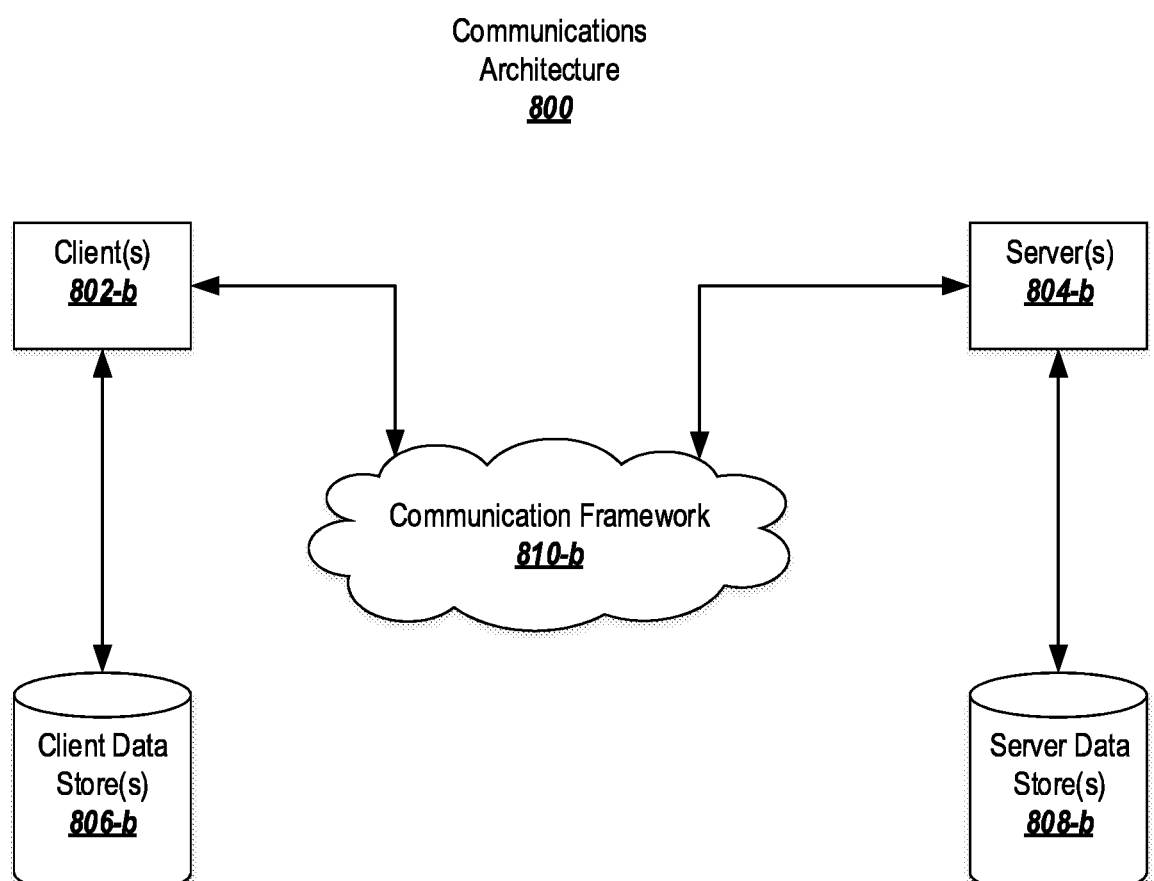
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
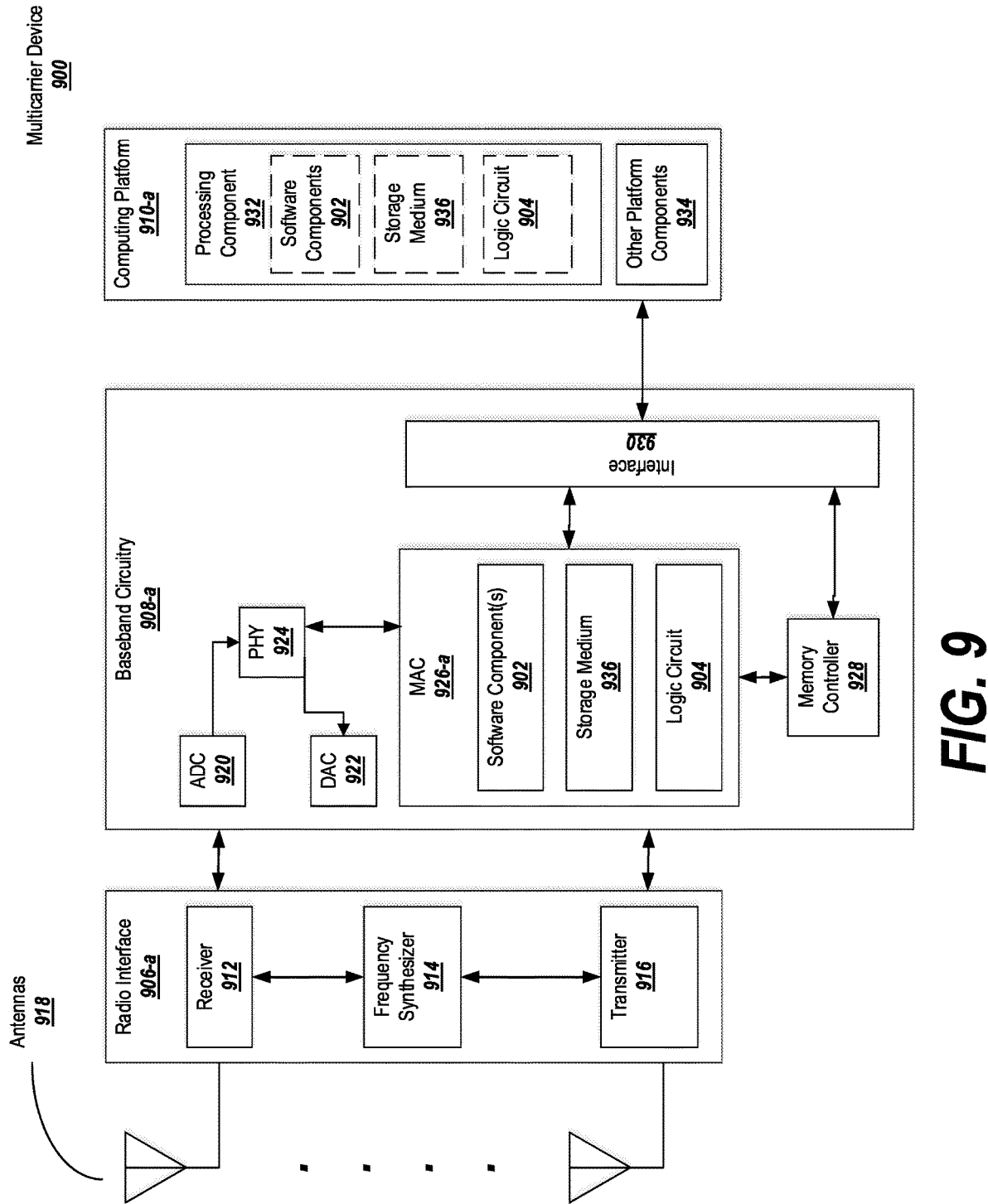
FIG. 9 is a block diagram depicting an exemplary multicarrier communications device.

FIG. 9 illustrates an embodiment of a device 900 for use in a multicarrier OFDM system, such as the messaging system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the messaging system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the messaging system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
analyzing a streaming video to detect indications of emotions in human faces appearing in the streaming video, the analysis comprising:
detecting a human face in one or more successive video frames of the streaming video;
placing a bounding shape around the human face;
locating one or more expressive regions of the human face in relation to the bounding shape; and
detecting indications of an emotion in the one or more expressive regions of the human face;
applying a media effect associated with the detected emotion to the one or more successive video frames; and
recording an entry in a media effect index stored on a non-transitory, computer-readable medium, the entry indicating the application of the media effect.

2. The method of claim 1, wherein the expressive regions of the face are located by defining one or more axes in the bounding shape to define the expressive regions of the human face, including a vertical axis bisecting the eyes, nose and mouth of the human face and a horizontal axis extending through the ears and eyes of the human face and further wherein the expressive regions are defined around the eyes and mouth of the human face.

3. The method of claim 1 further comprising:
receiving an audio feed associated with the one or more successive video frames; and
analyzing the audio feed to detect changes in speech indicative of an emotion.

4. The method of claim 1 further comprising:
receiving data from one or more sensors; and
analyzing the data to detect changes in the data indicative of an emotion;
wherein the sensors are selected from a group consisting of a heart rate monitor, a fingerprint sensor and a sensor for detecting motion of a mobile device.

5. The method of claim 1, the emotion being detected at a user device receiving the streaming video, further comprising:

automatically selecting a media effect based on preferences of a user of the user device or based on previous selections of a media effect by the user; and broadcasting the selected media effect to other users receiving the streaming video.

6. The method of claim 1, the emotion being detected at a user device receiving the streaming video, further comprising:

presenting a user of the user device with a plurality of media effects associated with the detected emotion;

receiving a user selection of one of the plurality of media effects; and broadcasting the selected media effect to other users receiving the streaming video.

7. The method of claim 1, the entry in the media effect index including an identifier of the applied media effect, a timestamp indicating when the media effect was applied and an identification of the human face associated with the application of the media effect.

8. A system comprising:

a processor;

a non-transitory, computer-readable storage medium; and memory, coupled to the processor, the memory containing instructions that, when executed by the processor, cause the system to:

analyze a streaming video to detect indications of emotions in human faces appearing in the streaming video, the analysis comprising:

detecting a human face in one or more successive video frames of the streaming video;

placing a bounding shape around the human face;

locating one or more expressive regions of the human face in relation to the bounding shape; and detecting indications of an emotion in the one or more expressive regions of the human face;

apply a media effect associated with the detected emotion to the one or more successive video frames; and record an entry in a media effect index stored on the non-transitory, computer-readable storage medium, the entry indicating the application of the media effect.

9. The system of claim 8 wherein the expressive regions of the face are located by defining one or more axes in the bounding shape to define the expressive regions of the human face, including a vertical axis bisecting the eyes, nose and mouth of the human face and a horizontal axis extending through the ears and eyes of the human face and further wherein the expressive regions are defined around the eyes and mouth of the human face.

10. The system of claim 8, the instructions further causing the system to:

receive an audio feed associated with the one or more successive video frames; and analyze the audio feed to detect changes in speech indicative of an emotion.

11. The system of claim 8, the instructions further causing the system to:

receive data from one or more sensors; and analyze the data to detect changes in the data indicative of an emotion;

wherein the sensors are selected from a group consisting of a heart rate monitor, a fingerprint sensor and a sensor for detecting motion of a mobile device.

12. The system of claim 8, the emotion being detected at a user device receiving the streaming video, the instructions further causing the system to:

automatically select a media effect based on preferences of a user of the user device or based on previous selections of a media effect by the user; and broadcast the selected media effect to other users receiving the streaming video.

13. The system of claim 8, the emotion being detected at a user device receiving the streaming video, the instructions further causing the system to:

present a user of the user device with a plurality of media effects associated with the detected emotion;

receive a user selection of one of the plurality of media effects; and broadcast the selected media effect to other users receiving the streaming video.

14. The system of claim 8, the entry in the media effect index including an identifier of the applied media effect, a timestamp indicating when the media effect was applied and an identification of the human face associated with the application of the media effect.

15. A non-transitory, computer-readable medium storing instructions configured to cause a processor to:

analyze a streaming video to detect indications of emotions in human faces appearing in the streaming video, the analysis comprising:

detecting a human face in one or more successive video frames of the streaming video;

placing a bounding shape around the human face;

locating one or more expressive regions of the human face in relation to the bounding shape; and detecting indications of an emotion in the one or more expressive regions of the human face;

apply a media effect associated with the detected emotion to the one or more successive video frames; and record an entry in a media effect index indicating the application of the media effect.

16. The medium of claim 15 wherein the expressive regions of the face are located by defining one or more axes in the bounding shape to define the expressive regions of the human face, including a vertical axis bisecting the eyes, nose and mouth of the human face and a horizontal axis extending through the ears and eyes of the human face; and further wherein the expressive regions are defined around the eyes and mouth of the human face.

17. The medium of claim 15, the instructions further configured to cause the processor to:

receive an audio feed associated with the one or more successive video frames; and analyze the audio feed to detect changes in speech indicative of an emotion.

18. The medium of claim 15, the instructions further configured to cause the processor to:

receive data from one or more sensors; and analyze the data to detect changes in the data indicative of an emotion;

wherein the sensors are selected from a group consisting of a heart rate monitor, a fingerprint sensor and a sensor for detecting motion of a mobile device.

19. The medium of claim 15, the emotion being detected at a user device receiving the streaming video, the instructions further configured to cause the processor to:

present a user of the user device with a plurality of media effects associated with the detected emotion;

receive a user selection of one of the plurality of media effects; and broadcast the selected media effect to other users receiving the streaming video.

20. The medium of claim 15, the entry in the media effect index including an identifier of the applied media effect, a timestamp indicating when the media effect was applied and an identification of the human face associated with the application of the media effect.

\* \* \* \* \*